Sept. 19, 1933.  C. E. KORTE  1,927,441
ARTIFICIAL LURE
Filed April 16, 1931
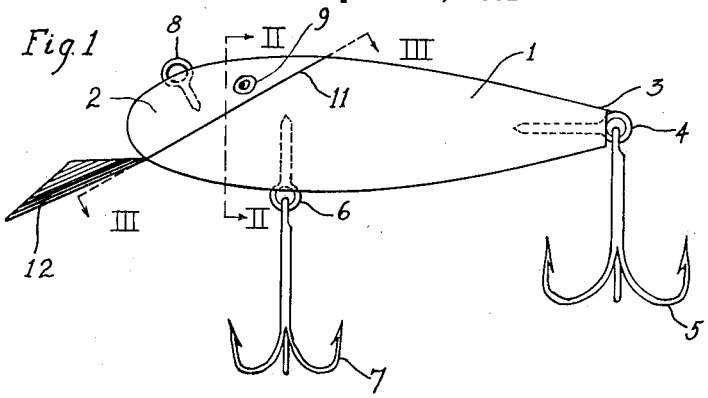
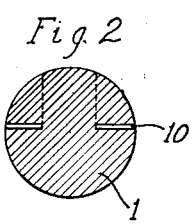
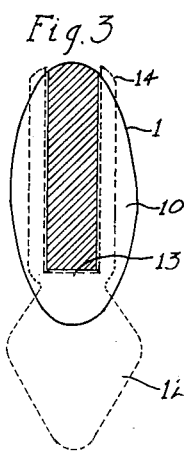
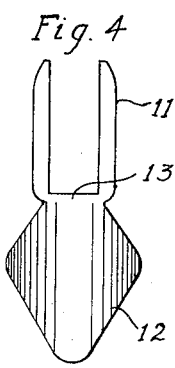
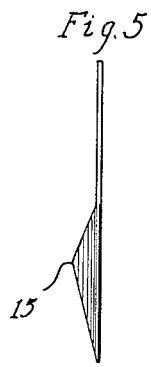
INVENTOR
Charles E. Korte
BY William B. Jaspert
ATTORNEY Patented Sept. 19, 1933

1,927,441

UNITED STATES PATENT OFFICE 1,927,441

ARTIFICIAL LURE

Charles E. Korte, Pittsburgh, Pa.

Application April 16, 1931. Serial No. 530,461

1 Claim. (Cl. 43—46)

This invention relates to improvements in artificial lures or baits for catching game fish and it is among the objects thereof to provide a combination lure which shall embody a detachable member to render it useful either as a surface lure or as a diving or submerged lure.

The invention briefly consists in the use of a detachable mouth piece which may be secured to or removed from the lure at will without the necessity of removing any screws or other interlocking members, and the objects and purposes of the invention will become more apparent from a consideration of the accompanying drawing in which like reference characters designate like parts and in which:

Figure 1 is a side elevational view of a lure of the so-called "plug" type embodying the detachable mouth piece of this invention;

Figure 2 a cross sectional view taken along the line II—II, Figure 1;

Figure 3 a sectional elevational view taken along the line III—III, Figure 1;

Figure 4 a top elevational view of the detachable mouth piece;

Figure 5 a side elevational view thereof; and

Figure 6 a side elevational view of a small bait or bug-like lure illustrating the employment of the invention to this species of fishing tackle.

With reference to Figures 1 to 5 inclusive of the drawing, the structure therein illustrated comprises a body 1 generally of the shape of a fish and which is constructed of a wood or cork substance, cedar and pine being commonly employed for lures of this character. The plug 1 has a relatively large or head end 2 and a constricted end 3, the latter being provided with an eye screw 4 which is screwed in the central axis of the body 1 and which is adapted to carry a fish hook 5, all in accordance with the customary practice.

At the bottom of the head end of the body, a similar screw eye 6 carries a hook element 7, the hooks 5 and 7 being so located on the fish body as to maintain the body in an up-right position as shown in Figure 1 when it is cast in the water. The head end of the body is further provided with a screw eye 8 to which the fishing line is attached in the usual manner, and lures of this type are commonly provided with beads or glass eyes 9 to produce the general appearance of a fish.

In accordance with the present invention the head end of the fish is provided with a slot 10, Figure 2, which is disposed at an angle with respect to the longitudinal axis of the body 1, this slot extending around the inner periphery of the body excepting a small portion at the top, this being clearly shown in Figures 2 and 3 of the drawing.

The slot is of a width to accommodate the tongues 11 of a bifurcated mouth piece 12 which may be of any shape and curvature but which is preferably of the form shown in Figures 4 and 5 of the drawing. The mouth piece is inserted in the slot 10 with the tongues 11 engaging the bottom of the slot and with the yoke portion 13 of the mouth piece against the bottom of the slot whereby a substantial portion of the mouth piece is inserted in the slot as shown in Figure 3. The tongues 11 will intimately engage the slot and together with the yoke portion 13 and the portion of the mouth piece which is inserted in the slot, provide a large area of contact of the mouth piece with the body 1. As shown in Figure 3, the tongues 11 may be of such length as to project slightly beyond the top of the body 1 and may be either left to protrude in the manner shown at 14 in Figure 3 or may be bent forward to more or less permanently secure the mouth piece in the body.

As shown in Figure 5, the mouth piece is curved as at 15 and is also slightly curved at its bottom portion, as shown in Figure 1. This is for the purpose of producing a desired movement of the lure when it is drawn through the water and the mouth piece may be bent to any desired shape or at any angle and may be used in the reverse position from that shown in Figure 1 by merely pulling it out of the slot and turning it around 180°. If so reversed, the lure will have a more pronounced diving action and may be employed as a deep water lure when desired.

As shown in Figure 6, the invention may also be applied to relatively small baits such as are commonly employed with fly rods and when so used they can be made to produce desired movements in the water either as a surface lure or as a submerged lure by removing the mouth piece or retaining it, as the case may be.

It is evident from the foregoing description that the detachable mouth piece renders the lure a combination bait in that, by its removal, the bait constitutes a standard form of surface lure and by inserting the mouth piece in its slot, the bait is constituted a submerging lure, and such combination bait will eliminate the necessity for carrying a large assortment of baits, as is the custom with fishermen, for the purpose of determining which bait may be effective for a particular character of fish or at a particular time, it being well known to sportsmen that the same fish in the same location will, at times, respond to a surface lure and entirely ignore submerged lures and at other times respond to nothing but a fairly deep lure.

Although one embodiment of the invention has been herein illustrated and described, it will be obvious to those skilled in the art that the detachable mouth piece disclosed herein may be applied to any form of plug, such as the minnow, pike, chub or mouse type of baits to obtain the combination character of the lure as herein described.

I claim:

An artificial lure comprising a body portion having a hook fastened thereto and having a slot extending across the front portion of the body and from the front rearwardly at both sides, at an angle to the longitudinal axis of said body, and a bifurcated mouth piece cut out to substantially the shape of said slot and having its bifurcated portion disposed in said slot whereby a substantial portion of the mouth piece is supported by and held in said slot.

CHARLES E. KORTE.